Nov. 12, 1968   A. JURAS   3,410,936
VACUUM CASTING METHOD AND APPARATUS FOR PRODUCING THE
METAL FIBER PLASTIC ARTICLES
Original Filed Jan. 30, 1961
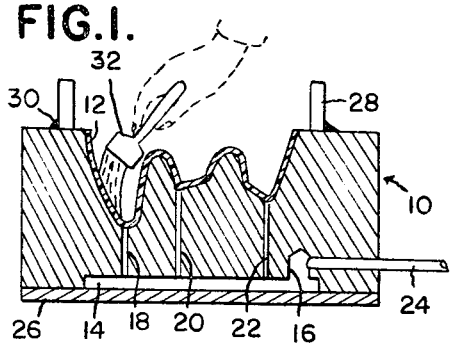
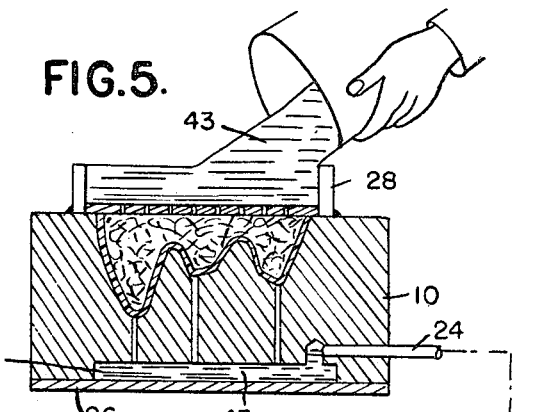
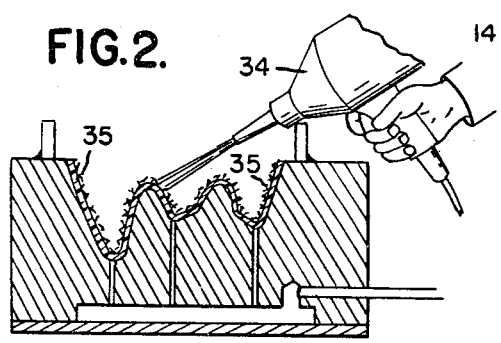
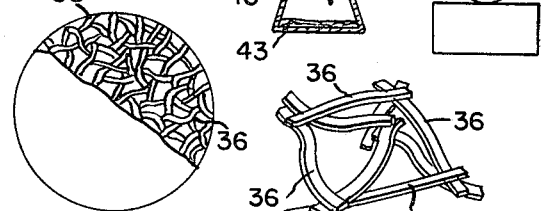
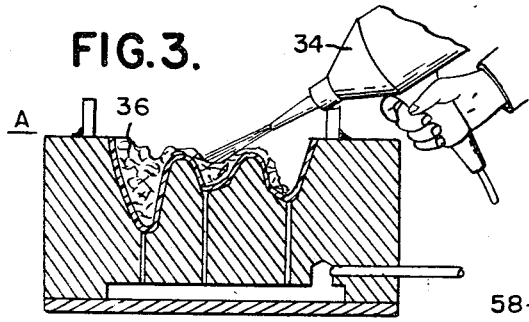
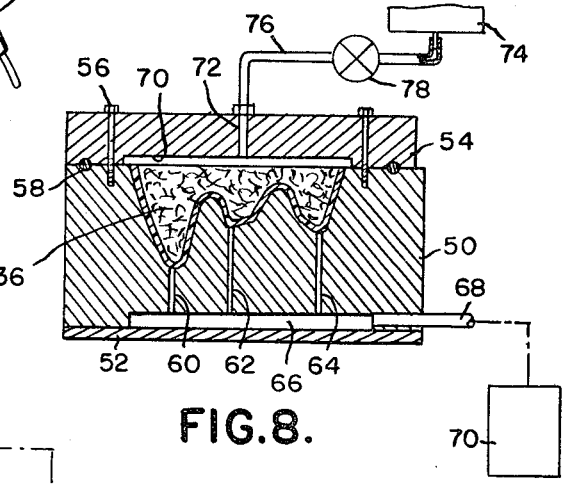
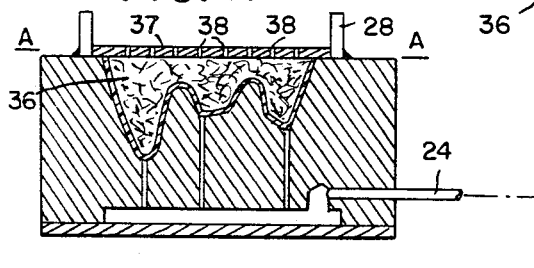
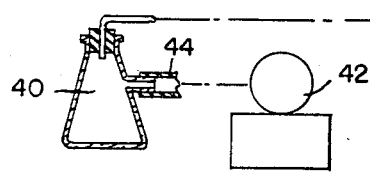
INVENTOR.
APPY JURAS
BY Whittemore, Hulbert & Belknap
ATTORNEYS United States Patent Office 3,410,936
Patented Nov. 12, 1968

3,410,936
VACUUM CASTING METHOD AND APPARATUS FOR PRODUCING THE METAL FIBER PLASTIC ARTICLES
Appy Juras, Madison, Wis., assignor, by mesne assignments, to University Patents, Inc., Chicago, Ill., a not-for-profit corporation of Illinois
Continuation of abandoned application Ser. No. 85,535, Jan. 30, 1961. This application Oct. 21, 1965, Ser. No. 500,385
8 Claims. (Cl. 264—90)

ABSTRACT OF THE DISCLOSURE

A method of making metal fiber reinforced plastic composite structures wherein the metal fibers are first deposited, preferably by air-felting, into the desired mold form, and subsequently, plastic is introduced into the interstices of the fiber mass by means of vacuum and then the plastic is cured. The metal fibers, because of their structure and the means of deposit, are maintained substantially unmoved during the vacuum impregnation.

---

This is a continuation of application Serial No. 85,535 filed January 30, 1961, now abandoned.

This invention relates to the method and apparatus for producing metal fiber plastic articles which are adaptable for producing castings, usuable as dies, fixtures, or the like for use in the tool and die industry as well as parts that would take the place of conventional metal castings such as pump housings and various other parts conventionally cast of solid metal. More particularly, this invention relates to a vacuum casting method and apparatus for producing the metal fiber plastic articles.

The prior art discloses several methods for producing metal fiber containing structures including the type known as the pressure method which requires the use of pressures above one atmosphere, in the range between 20 pounds per square inch and higher, up to 300 pounds per square inch. With such a method, pressure is applied to a loosely packed mass of metal fibers such as a mass of unwoven, continuous length, metallic filaments such as copper wool, steel wool, or the like so as to press the mass down into a mixture comprising liquid heat-hardenable resin and a small quantity of metal fibers. This results in a large mass of metal fibers being compressed and then immersed in resin and forced to intertwine and intermix with the resin covered metal fibers. When the metal fibers are covered with the resin and sufficiently well compacted, the thermosetting resin is cured by means of the application of heat. The resulting articles contain closely knit metal fibers imbedded in an infusible matrix of heat-hardened synthetic resin.

The use of the pressure method as just described has a certain number of drawbacks. It has been found that the compacting of metal fibers tends to stratify them in horizontal layers and to bridge sharp detail and corners, leaving resin rich or un-reinforced areas at the most critical points. Once pressure is applied to a bulk of metal fiber, to compress it into a given space, the fibers become locked one to another and defy movement into the mold detail. This resistance to further flow by the fiber is even increased as further pressure is applied. Pressure orients the metal fibers altering considerably the randomly—yet orderly geometric distribution which ordinarily results from introducing the metal fibers in an air stream at a steady rate of flow. It is the random, yet orderly geometric orientation of the metal fibers which gives strength to the final product which is substantially uniform in all directions. Thus, the application of pressures in compacting the metal fibers, in excess of one atmosphere, detracts directly from the strength of the final product.

Another disadvantage which is of equal importance with the random metal fiber orientation in achieving stress resistance in the final product is the uniform distribution of metal fibers throughout the thermoset resin matrix. The pressure method does not produce uniform density of metal fibers in the product, particularly where there is a relatively great disparity between the shallowest and deepest depths of the mold. For example, in fabricating a casting in a mold box containing the model, metal fibers, placed directly on the top of the highest point of the model are subject to greater pressures and hence, pack more densely than metal fibers surrounding the base of the model, with the result that a gradient of metal fiber density from the shallowest portion of the mold to the deepest portion thereof exists. Obviously, the strength of such a casting will vary in proportion to the metal fiber density.

In order to practice the aforementioned pressure method, it is necessary to have expensive equipment which is large and extremely bulky. For example, to make a casting 12 inches thick by the pressure method, it is necessary to have a box built up on top of the mold 3 to 4 feet high in order to contain the bulky steel wool type of fibers and even with this high mold build-up, several loadings and pressings of the fibers must take place before the final pressure is applied to consolidate the mass. A press having a stroke of 5 to 6 feet is required and must be able to exert pressures of 300 p.s.i. or more to achieve sufficient density to make a casting. The press used must also be capable of holding this pressure for 8 to 12 hours and this has been a further disadvantage.

In addition, the pressure method has not been satisfactory for producing metal fiber reinforced resin compositions which are of the non-porous types.

Another method of forming the metal fiber resinous article included the steps of coating suitable metal fibers with a thermosetting synthetic resin and then distributing the coated metal fibers by a gravity drop in the desired mold. The next step required sintering the synthetic resin between contiguous coated fibers in curing the synthetic resin coating with about 20 pounds per square inch gage pressure to form a highly porous pre-form structure of metal fibers coated with infusible synthetic resin.

In order to form a semi-porous or completely non-porous solid metal fiber resinous article with the use of about 20 pounds per square inch gage pressure, it requires the removal of the sintered completely cured porous coated metal fiber article from the mold and then filling the mold with a liquid thermosetting synthetic resin. The pre-form structure is then inserted and immersed in the resin at 20 pounds per square inch gage pressure. The degree of porosity of the resulting article was varied by varying the time and rate during which the coated metal fiber structure is immersed in the resin.

The last aforementioned method has not been successful since it required many excessive and time-consuming steps than are necessary to form a non-porous metal fiber resinous article including the formation of the porous pre-form. In addition, the pre-form is fixed in place with suitable clamps to prevent the pre-form from rising out of the mold. It was also necessary to sinter at temperatures of 350° to 450° F. and this temperature often cracked the mold, making it unusable for the next operation of immersion.

It is an object of the present invention to provide a novel method and apparatus for producing metal fiber plastic articles or structures of good quality.

It is another object of the present invention to provide a vacuum casting method and apparatus for producing a metal fiber plastic structure having randomly, yet geometrically oriented metal fibers in a highly uniform density throughout the entire structure.

Still another object of the present invention is to provide a method of making a metal fiber plastic article of manufacture which comprises the steps of randomly and uniformly distributing the metal fibers in a mold so as to form a fibrous mass of substantially uniform density, establishing a supply of liquid, curable, plastic which is in communication with the interior of the mold, and applying vacuum to the interior of said mold so as to move the plastic through the fibrous mass to homogeneously and speedily impregnate said mass with the plastic.

A further object of the present invention is to provide a method of making a metal fiber containing resinous article of manufacture comprising the steps of randomly and uniformly distributing metal fibers less than three inches in length in a mold so as to form a fibrous mass of substantially uniform density, establishing a supply of a liquid, curable resinous composition which is in communication with the interior of the mold, and applying vacuum to the interior of said mold so as to move the resinous composition downwardly through the fibrous mass with the help of the atmospheric pressure acting on the resinous composition to homogeneously and speedily impregnate said mass with the resinous composition.

A still further object of the present invention is to provide a casting apparatus for forming metal fiber resinous articles comprising in combination a mold, a source of a resinous composition means connecting said source to the interior of the mold, and means for evacuating the interior of the mold.

Another object is to provide an improved and simplified method and apparatus of the aforementioned type having certain advantages contributing to efficiency, reliability and long life and which is fast acting and economical.

Other objects and features of the invention will become apparent as the description proceeds, especially when taken in conjunction with the accompanying drawing, illustrating preferred embodiments of the invention, wherein:

FIGURE 1 is a sectional view through the mold showing in particular the optional preparatory treatment of the mold surface.

FIGURE 2 is a sectional view through the mold showing the optional manner in which metal fibers are flocked or sprayed on the prepared mold surface.

FIGURE 3 is a sectional view through the mold showing the use of a fiber-flow metal spray gun for completely filling the mold with dry uncoated metal fibers.

FIGURE 4 is a sectional view through the mold showing the addition of a metal plate to the upper end of the mold and the connection of the interior of the mold to a vacuum pump.

FIGURE 5 is a sectional view through the mold showing the application of the plastic to the mold.

FIGURE 6 is a view, partly in section, illustrating the uniform orientation or distribution of the fibers in the mold.

FIGURES 7 is an enlarged view illustrating lines of orientation of the fibers showing the approximately uniform interlocking geometric shapes achieved using the spray gun technique.

FIGURE 8 is another embodiment of the present invention, utilizing a completely closed system.

FIGURE 1 shows a mold 10 which is made from an appropriate tooling cement which has a very low rate of expansion such as plaster of the type called Ultracal 30. The mold 10 is prepared at room temperature with an epoxy resin and metal fiber face 12. Prior to the use of the mold 10, the epoxy and metal fiber face 12 has an appropriate releasing or parting agent applied thereto. Immediately thereafter, a high temperature wax is applied to the face 12 so as to aid in releasing the desired article of manufacture. The plaster mold 10 is dried at not more than 125 degrees Fahrenheit for six to eight hours prior to making the casting.

The mold 10 includes a vacuum chamber 14 and a resin passage 16. A plurality of vacuum passages 18, 20 and 22 connects the low points of the mold 10 with the vacuum chamber 14. As an example, for a small mold, the passages have a diameter from .020 to .040 inch and are spaced one to three inches apart depending on the complexity of the mold 10. A tube or conduit 24 is adapted to be inserted into the mold 10 so as to intersect the passage 16 on one end and is adapted to be connected on the other end to a vacuum pump as will be subsequently described. A tempered masonite or metal bottom plate 26 is appropriately connected to the bottom of the mold 10 so as to enclose the vacuum chamber 14. The plate is connected to the mold 10 with an epoxy or polyester resin so as to provide a vacuum-tight seal. Dow-Corning high vacuum grease will also provide an effective seal.

A temporary resin containing structure 28 is connected or placed on top of the mold 10. The structure 28 may be made of wood, plaster, masonite or similar cheap and expendable material. A gunk seal 30 is provided between the structure 28 and the mold 10 with polyester, epoxy resin or Dow-Corning high vacuum grease.

After the casting apparatus just described has been completed, a curing epoxy gel coat is applied to the face or surface 12 by a brush 32. The gel coat is applied at room temperature. Immediately thereafter, a metal fiber spray gun 34 distributes metal fibers 35 at random onto the gel coat. The gel coat is allowed to become tack free and then the excess metal fibers are blown off from the gel coat. This gel coating operation is used only in instances where a different metal is used as a surfacing media to obtain superior wear properties compared to the metal fiber used in the body of the cast.

The metal spray gun 34 is of the type sold under the trademark "Fiber-Flow" model F-1, as manufactured by the Ohio Metal Fibers, Inc., of Toledo, Ohio.

After the excess metal fibers have been removed, a fine wire probe is moved through the vacuum holes or passages 18, 20 and 22 so as to insure that the holes are not plugged. The mold 10 is then completely filled with dry uncoated metal fibers up to the line indicated by letter A of FIGURE 3. The metal fiber spray gun 34 is moved by the operator so as to keep the metal fibers 36 circulating until they find a place so that they can lock and are maintained in such locked, immovable position during the subsequent processing as hereinafter taught into each other. The metal fibers 36 keep moving until they are locked in place, thereby resulting in a compact fiber-filled mold which has a high and uniform density throughout the entire mold including the corners thereof.

After the fibers 36 have built up to line A, as shown in FIGURE 4, a sheet of aluminum metal is placed on top of the mold 10 resting on line A. The metal plate is designated by the numeral 37 and includes therein a plurality of small ports or passages 38 which provide communication between the plastic and the metal fibers. As an example, the aluminum plate 37 is precut and drilled with .032 inch diameter holes spaced ½ inch apart over the entire surface. After the plate 37 has been placed on the mold 10, a resin collector, such as the Erlenmeyer vacuum flask 40, is connected to the outer end of the conduit or tubing 24. In addition, a vacuum pump 42 is provided which is appropriately mounted off the ground. A hose 44 connects the flask 40 with the vacuum pump 42 as is diagrammatically illustrated in FIGURES 4 and 5.

After the mold 10 and vacuum pump 42 have been connected in the manner described, the resin mix 43 is then prepared. Initially, a resin and a hardener are mixed together, and as an example, in the ratio as follows:

```
                                                   Parts
2256 epoxy resin (Union Carbide Plastic Com-
  pany) ------------------------------------- 100
Tonox hardener (Naugatuck Chemical Company) 35.5
```

Tonox is a crystalline hardener and must be melted before mixing with the resin (150 degrees to 180 degrees Fahrenheit). Sufficient resin and hardener should be mixed to leave approximately ¼ inch of excess resin above aluminum plate 37 to insure a vacuum seal after the casting has been impregnated.

After the resin and hardener have been prepared to form the resinous composition 43, it is appropriately poured into the resin holding structure 28, as is best illustrated in FIGURE 5. Immediately thereafter, the vacuum pump 42 is turned on. The resin level will fall rapidly, like the lowering of a window shade, impregnating the metal fibers 36 within five seconds to several minutes depending, of course, on the viscosity of the resin being used. The absolute pressure acting on the resinous composition 43 is 14.7 pounds per square inch or less. A short additional time will be required for the resin to fill the vacuum chamber 14 at the bottom of the mold 10 and bleed into the flask or collector 40. When the resinous composition 43 appears in the flask 40, allow approximately ⅛ of an inch thickness to gather at the bottom of the flask 40. Then pinch or shut off the tubing 24 so as to stop the flow of the resinous composition, thereby sealing the casting in the mold 10. Immediately upon closing the tube 24, the vacuum pump 42 is stopped.

The amount of cure imparted to the resin-impregnated casting is important to achieve the maximum dimensional stability and best duplication. The resinous composition 43 must be advanced beyond the liquid stage, but must not reach the infusible or heat-hardened stage. This "in between" stage of cure is generally termed the "B-stage" in the art. The state of cure before "B-stage" is known as the "A-stage." In the present invention, the casting is allowed to stand at room temperature for twelve to eighteen hours to achieve the "B-stage" condition. At this point, the casting is generally moved into a cold oven gradually raising the temperature not higher than 180° F. It is very important not to exceed this temperature and it is desirable to only partially cure the resinous composition in the mold.

When the casting is hard, without having exceeded the temperature of 180° F., the casting is then removed from the mold 10. The aluminum plate 37 on the base of the casting can be readily removed by a sharp hammer blow on the edge of the aluminum plate 37 inasmuch as unfilled and only partially cured resin is holding it to the castings and it will easily shear. The castings is then placed on a flat metal plate and returned to the oven, allowing the temperature thereof to rise from 180° F. to 350° F., long enough for all sections of the casting to remain at 350° F. for at least two hours.

Minor machining may be required on the casting to remove irregularities left from the holes in the aluminum plate 37.

Another examule of a room temperature curing resin system that can be successfully employed without need of B and S staging and subsequent heat curing is as follows:

```
                                                   Parts
2774 epoxy resin (Union Carbide Plastic Company) 100
0914 hardener (Union Carbide Plastic Company) __  25
```

Sufficient resin and hardener should be mixed to leave approximately ¼ inch of excess resin above aluminum sheet 37 to insure a vacuum seal after the casting has been impregnated.

After the resin hardener has been mixed to form the resinous composition 43, it is appropriately poured into the resin holding structure 28, as is best illustrated in FIGURE 5. Immediately thereafter, the vacuum pump 42 is turned on. The resin level falls rapidly, impregnating the metal fibers 36 within three minutes with this particular higher viscosity resin system.

Cure will take place spontaneously from the reaction of the 2774 epoxy resin and 0814 hardener. Cure in small castings will take place in one to two hours, while in larger castings, a one-half hour to one hour cure is generally sufficient due to the higher exotherm of the larger mass, which effects a more speedy cure. No further oven curing is required; at this point, the casting may be removed from the mold and put to use.

As previously mentioned, the spray gun 34 sprays the metal fibers 36 into the mold 10 in such a manner that a uniform orientation of the fibers 36 results in a uniform density of the resulting structure as shown in FIGURE 6. FIGURE 7 is an enlarged view illustrating the lines of orientation of the fibers showing the approximate uniform interlocking geometric shapes achieved with the application of the spray gun method of blowing the fibers 36 into the mold 10.

Materials useful in the novel method of my invention for making metal fiber containing structures are numerous with regard to both the metal fibers 36 and the plastic or resinous composition 43. The lengths and cross sections of metal fibers 36 used depend upon the end use of the cast article being made. Metal fibers in the cross-sectional range from 0.0001 inch to 0.040 inch and length ranges from .010 inch to 3 inches are most desirable. By selecting both cross sections and lengths from this range, variable degrees of density are readily obtained without the use of pressure. As an example, a copper fiber which has a cross section of 0.0035 inch by 0.002 inch and is ⅛ inch long will "air felt" into a mold by means of the spray gun 34 without pressure at 60 pounds per cubic foot. Another copper fiber with exactly the same cross section but a length of 3/16 inch will "air felt" into the mold at 40 pounds per cubic foot.

Only slight changes in either or both cross section and length will give a different density. It is possible to obtain an infinite range of densities by pre-selection of fiber dimension rather than by pressure. I prefer metal fibers having a length of from 1/32 inch to ½ inch to achieve the optimum fiber density and resin impregnability. Fibers useful in this invention can be drawn, extended, cut, broached, turned or otherwise formed into elongated shapes.

Metal fibers such as those manufactured by Metal Fibers, Inc., Detroit, Mich., are the preferred types. Basically, the metal fiber plastic articles comprise a myriad of relatively short metal fibers 36 which are basically square or rectangular in cross section and which are fairly uniform in their general geometrical configuration but possess a number of irregularly occuring non-uniform features such as twists along their longitudinal axis, sharp protuberances and small barbs extending from their generally planar surfaces. The metal fibers therefore hook and intertwine one with another to form orderly geometrically patterned arrangements as is shown in FIGURES 6 and 7. The use of pressure to compact these fibers destroys this orderly arrangement and prevents exploitation of the benefits, particularly strength, inherent ina geometrical arrangement.

The common steel, aluminum and copper wools normally used for household and industrial scrubbing, polishing and maintenance work are not desirable types of metal fibers to use inasmuch as they have high bulk requiring the use of mechanical or hydraulic pressure to achieve densities sufficient to properly reinforce a casting. They also have "matting and balling" characteristics which tend to give decidedly non-uniform reinforcing.

Many different kinds of metal fibers have been used successfully as fillers including steel fibers, aluminum fibers, copper fibers, tungsten fibers, molybdenum fibers, stainless steel fibers, nickel fibers, bronze fibers and zinc fibers.

Useful plastics include both the thermoset and thermoplastic types. As examples of the thermosetting type, it is possible to use the phenolic resins, polyester, epoxy resins of the glycidly ether type and epoxy resins of the peracetic acid derivative type. These classes of thermosetting resins provide the excellent adhesiveness and bond strength required.

Among the phenolic resins it is desirable to use condensation products of 2,4,6-tris(hydroxymethyl) phenol, phenol-formaldehyde resoles and novalacs; dimethylol ureas; dimethylolmelamine; trimethylolmelamine and other melamines; acetone-formaldehyde resin; and dimethyl hydantoinformaldehyde resin. It is further desirable to use phenol formaldehyde resins containing less than one mole of formaldehyde per mole of phenol; i.e., the novalacs.

The unsaturated polyester compositions suitable for the articles are the esterification products of ethylenically unsaturated dibasic acids or their anhydrides, such as fumaric acid and maleic anhydride, or mixtures of such acids or anhydrides with saturated acids or anhydrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalysts and activating agents will polymerize either at room temperature or by the application of heat and slight pressure to solid infusible plastic. The polymerization is exothermic and no volatile by-products are formed. Pure glycol maleatestyrene copolymer is rather brittle, but using longer glycols or by replacing part of the maleic acid with long chain aliphatic acids, such as adipic acid, a tougher and more flexible resin is obtained.

Suitable catalysts for unsaturated polyester compositions as above described are free radical initiators such as peroxides and azo compounds, such as benzoyl peroxide, tertiary butyl perbenzoate, methyl ethyl ketone, peroxide and the like. Since most unsaturated polyester compositions are unstable on storage, they usually are marketed in the liquid form and contain a stabilizing inhibitor such as teritary butyl catechol, hydroquinone and the like. The curing catalyst is then added just prior to the intended time of using the polyester compositions.

Among the epoxy resins of the glycidyl ether type, it is desirable to use the polyglycidyl ethers of polyhydric phenols. Suitable di- and polynuclear phenols useful for the preparation of the polyglycidyl ethers are the bis-phenols and polyphenols such as the novalac condensation product of a phenol and a saturated or unsaturated aldehyde containing an average of from 3 to 20 or more phenylol groups per molecule. Examples of suitable polyphenols derived from phenol and an unsaturated aldehyde, such as acrolein, are the triphenylols, pentaphenylols and heptaphenylols.

The polyhydric polynuclear phenols can consist of two or more phenols connected by such groups as methylene, alkylene, ether, ketone or sulfone, exemplified by the following compounds: bis(p-hydroxyphenyl) ether, bis(p-hydroxyphenyl) ketone, bis(p-hydroxyphenyl) methane, bis(p-hydroxyphenyl) dimethyl methane, bis(hydroxyphenyl) sulfone, or trisphenol.

The useful epihalohydrins for reaction with the above di- and polyhydric phenols include epichlorohydrin.

It is preferable to use as an epoxy resin of the glycidyl ether types the polyglycidyl ester of 2,2 bis(4-hydroxyphenyl) propane; the triglycidyl ether of tris, 1,1,3-(hydroxyphenyl) propane; mixtures of the above with minor proportions of bis(2,3-epoxy-cyclopentyl) ether and/or butyl glycidyl ether; the diglycidyl ether of dihydroxy diphenyl methane; and the polyglycidyl ether of a 6-7 ring phenol formaldehyde novalac.

Among the peracetic acid derived di- and polyepoxides, it is desirable to utilize alkyl 9,10-epoxystearate; butadiene dioxide; 1,2-diisobutylene dioxide; 3,4-epoxy-6-methylcyclohexylmethyl 3,4-epoxy-6 methylcyclohexanecarboxylate; 3,4-epoxycyclohexane carbonitrile; 2,3-epoxy-2-ethylhexanol; 3,4-epoxy - 6 - methylcyclohexylmethyl acetate; ethyl 3-oxatricyclo-(3.2.1.0$^{2,4}$)-octane-6-carboxylate; styrene oxide, triisobutylene oxide; vinylcyclohexene dioxide; and vinylcyclohexene monoxide.

Conventional hardeners are used with the above-described reins of the types and in amounts well known to those in the art. It is desirable to employ hexamethylene tetramine as a hardener in the phenolic type resins. With the epoxy resins, it is desirable to use as hardeners acid anhydrides, amines and mixtures of amines because of their low cost and good reactivity rates. Among the suitable amines, aromatic amines are most desirable. Typical of these compounds are: -methylbenzyldimethylamine; 4,4'-methylene dianiline and phenylene diamine.

The following thermoplastics have been used successfully to make metal fiber reinforced plastic vacuum casts; acrylic; polyethylene; and silicone rubber.

As with any metal fiber containing plastic articles, the articles can include fillers, colorants, pigments and similar additives conventionally used in conjunction with the plastics.

Contrasting the pressure method with the new vacuum method time-wise, two identical castings were made with the following comparison:

PRESSURE METHOD

| | Hours | Minutes |
|---|---|---|
| Casting—5″ deep x 10″ x 10″: | | |
| Mold preparation, mold box build up | 4 | |
| Pre-saturation of part of fibers | | 30 |
| Packing pre-saturated fibers in the bottom of mold | | 30 |
| Loading mold with balance of dry fibers (3 loadings and pressings before final pressure was applied | 1 | |
| Time to cast (pressures applied gradually) | 1 | |
| Time in press (casting must be watched and given additional pressure at intervals of about 1 hour until B staging takes place) | 12 | |
| Remove from mold | 1 | |
| Clean up casting and machine back side | 3 | |
| Place casting in oven for final cure | 4 | |
| Repair surface porosity | 4 | |
| Total time | 31 | |

Quality of casting—poor.

VACUUM METHOD

| | Hours | Minutes |
|---|---|---|
| Casting—5″ deep x 10″ x 10″: | | |
| Mold preparation, mold box build-up | 1 | |
| Pre-saturation of fibers (operation eliminated) | 0 | |
| Packing pre-saturated fibers in bottom of mold (operation eliminated) | 0 | |
| Loading mold with dry metal fibers | | 5 |
| Pressing before final pressure applied (operation eliminated) | 0 | |
| Time to cast | | 1 |
| Time in press (operation eliminated) and it is not necessary to keep the casting under observation during B staging | 0 | |
| B staging time | 12 | |
| Remove from mold | | 15 |
| Clean up casting and machine back side (machining operation eliminated, only light sanding required) | | 30 |
| Final cure in oven | 4 | |
| Repair surface porosity (eliminated) | 0 | |
| Total time | 17 | 51 |

Quality of casting—excellent.

Experience in making over 500 pressure type castings has resulted in only 10% of usable castings and even this 10% was not of high quality, having surface and internal porosity, detrimental to the intended end use of the castings. Whereas, with the method described herein, 99% of over 300 castings made by the vacuum method described have been of perfect quality, free of both surface and internal porosity and with no resin rich areas.

Although this invention has been described as using metal fibers as the filler, it should be understood that other types of particulate fillers or reinforcements have been successfully used, such as iron powder, aluminum powder, silicon carbide—granular, iron flakes, stainless steel flakes, phenolic micro-balloons, gravel aggregate and sand. The use of the term "particulate fillers" in the claims will include fillers of the type just described herein as well as metal fibers.

Another embodiment of the present invention is shown in FIGURE 8. The mold 50 has a bottom plate 52 and a top plate 54 which is bolted to the surface of the mold 50 by means of bolts 56. An O-ring seal 58 provides for fluid-tight mold. Resin bleed passages 60, 62 and 64 lead from the low points of the mold 50 and intersect the resin collecting chamber 66 which in turn communicates through a conduit 68 with a resin collector 70.

Prior to the placing of the top plate 54 on the mold 50, the metal fibers 36 are sprayed into the mold 50 in the manner described for the embodiment shown in FIGURES 1–5. However, instead of placing the aluminum plate 37 thereon, the top plate 54 is appropriately clamped to the mold 50. The plate 54 has a centrally located vacuum chamber 70 and has a connection 72 extended outwardly therefrom which is adapted to be connected to the mixing head of a dispenser and mixer system 74, such as described in the United States Patent No. 2,788,953. The system 74 is marketed under the trademark "Novo" by the Mitchell Specialty Division of Industrial Enterprises, Inc. of Philadelphia, Pennsylvania.

Interposed in the conduit 76 connecting the conduit 72 with the dispenser 74 is a manually operated valve 78. The valve 78 is manually turned to allow the resin and hardener mixture to enter the mold 50 after the air has been evacuated from the mold 50. Such a system provides a completely closed system, thereby eliminating the necessity of handling the resinous compositions 43 as utilized in the other embodiment. The mold 50 is prepared in the manner described for the other embodiment.

This closed system has many advantages and is uniquely adaptable to metal fiber reinforced plastic casting as described in this invention because of the uniformity of the interstices created by the type and method of introducing the dry fiber to the mold. Also, it is difficult to mix and meter highly filled resins on an automatic basis because of their abrasiveness and tendency to wear out such equipment. By this method no fillers are mixed with the resin; therefore, only non-abrasive resin and hardener fluids need be metered by such equipment. Whether a plastic casting is made by such automatic equipment or the more conventional methods of casting in open molds, whereby the plastic is generally mixed with various fillers, it has been a decided disadvantage to use such filled resins inasmuch as considerable air is introduced into the resin at the time such fillers are added, with the end result that this air cannot be liberated, being trapped within the casting as it solidifies during cure.

The exact reverse is true with the method described herein, in that as the unfilled resin is introduced into the mold, it is "knifed" by countless edges of the fibers and deaerates any included air in the resin itself. This air is constantly removed by the vacuum pump as the liquid resin impregnates the metal fiber mass resulting in exceptionally sound castings.

A further advantage of this system is that toxicity hazards are practically reduced to zero. Also, it is economical in that resin waste is held to a minimum.

It should be understood that the spray gun technique is particularly adaptable for fibers having lengths less than ½ inch. It is desirable to use fibers from 1/16 to ⅜ inch long. When using longer fibers, any sort of a gravity drop may be utilized so as to allow the fibers to freely flow into the mold and properly intertwine in the manner previously described. Regardless of the technique used, no compression of the fibers takes place. In addition, various fibers may be used such as copper, zinc, aluminum, steel, etc.

The cast articles made in accordance with the method and apparatus described herein are especially useful in clutch facings, brake linings, dies, checking fixtures, bearings or the like.

The drawing and the foregoing specification constitutes a description of the improved vacuum method and apparatus for making cast metal-fiber resinous articles in such full, clear, concise and exact terms as to enable any person skilled in the art to practice the invention, the scope of which is indicated by the appended claims.

I claim as my invention:

1. The method of making a metal fiber plastic article of manufacture which comprises the steps of:
    randomly distributing short length, interlockable metal fibers in a mold to form a fibrous mass and to substantially fill said mold therewith;
    substantially closing the interior of said mold to the outside atmosphere;
    placing a supply of liquid, curable plastic in communication with the interior of said mold, and moving the plastic through and into said fibrous mass to homogeneously impregnate said mass with said plastic by applying vacuum to the interior of said mold, and at the same time maintaining the individual metal fibers substantially immovable.

2. The method of making a metal fiber plastic article of manufacture which comprises the steps of:
    randomly distributing short length, interlockable metal fibers in a mold to form a fibrous mass and to substantially fill said mold therewith;
    substantially closing the interior of said mold to the outside atmosphere;
    placing a supply of liquid, curable plastic in communication with the interior of said mold;
    moving the plastic through and into said fibrous mass to homogeneously impregnate said mass with said plastic by applying vacuum to the interior of said mold and at the same time maintaining the individual metal fibers substantially immovable, and removing the resulting cast plastic article from said mold when said cast has hardened.

3. The method as defined in claim 1 wherein the plastic is a synthetic resin.

4. The method as defined in claim 1 wherein the plastic is a synthetic resin of the thermosetting type.

5. The method as defined in claim 1 wherein the plastic is a synthetic type of the thermoplastic type.

6. The method as defined in claim 1 wherein said metal fibers are less than 3 inches in length.

7. The method of making a metal fiber plastic article of manufacture which comprises the steps of:
    randomly distributing short length, interlockable metal fibers in a mold to form a fibrous mass and to substantially fill said mold therewith;
    substantially closing the interior of said mold to the outside atmosphere;
    placing a supply of liquid, curable plastic in communication with the interior of said mold, and moving the plastic through and into said fibrous mass to homogeneously impregnate said mass with said plastic by applying a differential pressure between said plastic source and the interior of said mold and at the same time maintaining the individual metal fibers substantially immovable.

8. The method of making a metal fiber plastic article of manufacture which comprises the steps of:
    randomly distributing short length, interlockable metal fibers in a mold to form a fibrous mass and to substantially fill said mold therewith;

substantially closing the interior of said mold to the outside atmosphere;

placing a supply of liquid, curable plastic in communication with the interior of said mold, and moving the plastic through and into said fibrous mass and at the same time maintaining the individual metal fibers substantially immovable to homogeneously impregnate said mass with said plastic by applying positive pressure to said plastic.

References Cited

UNITED STATES PATENTS

| | | | |
|---|---|---|---|
| 2,774,108 | 12/1956 | Wyllie | 264—128 X |
| 2,903,389 | 9/1959 | Fujita | 264—128 X |
| 3,041,131 | 6/1962 | Juras | 161—125 |

ROBERT F. WHITE, *Primary Examiner.*

K. J. HOVET, *Assistant Examiner.*